Jan. 19, 1937.  J. F. KOHLER  2,067,968
DEPOSITING MACHINE
Filed Sept. 9, 1935  3 Sheets-Sheet 2
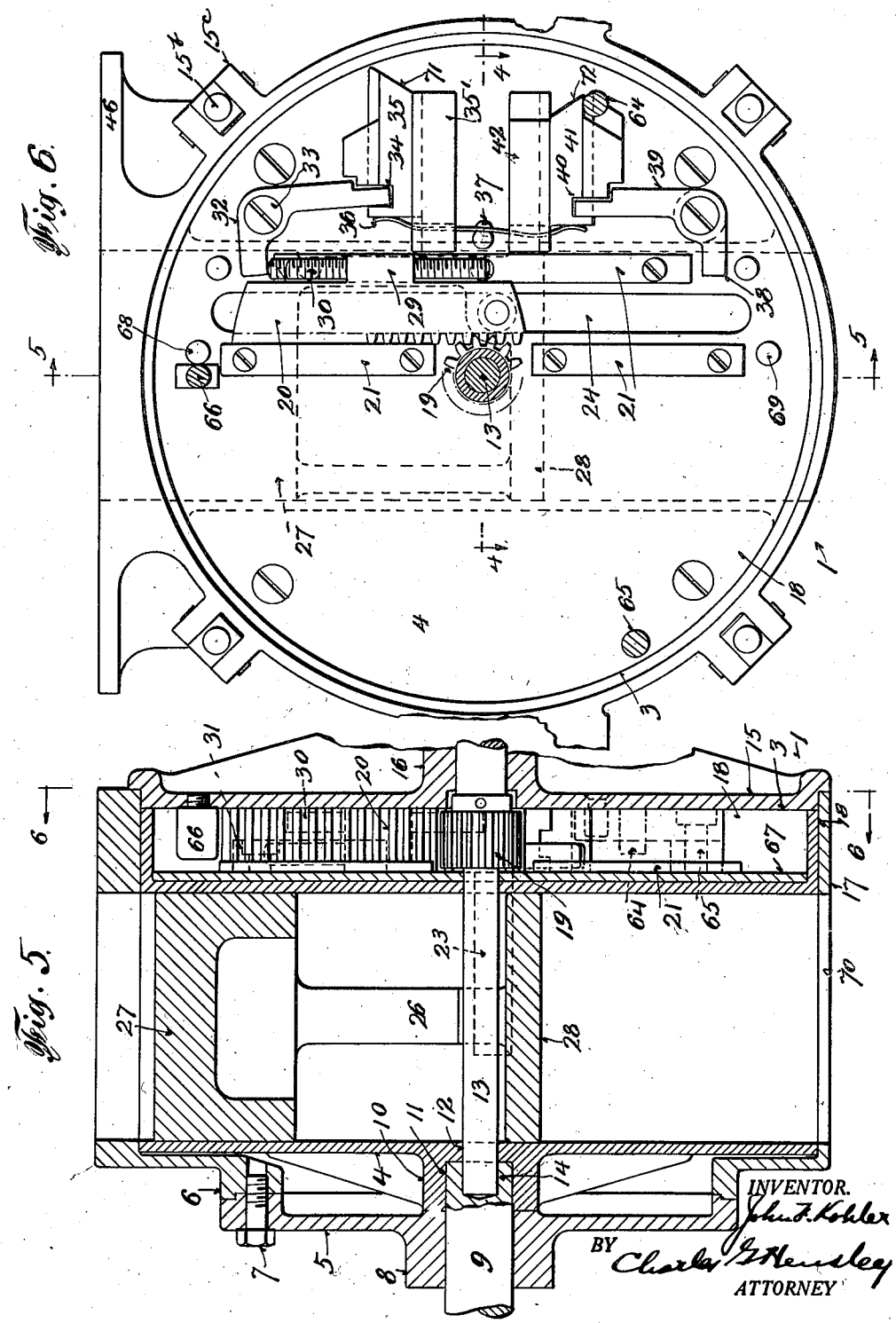

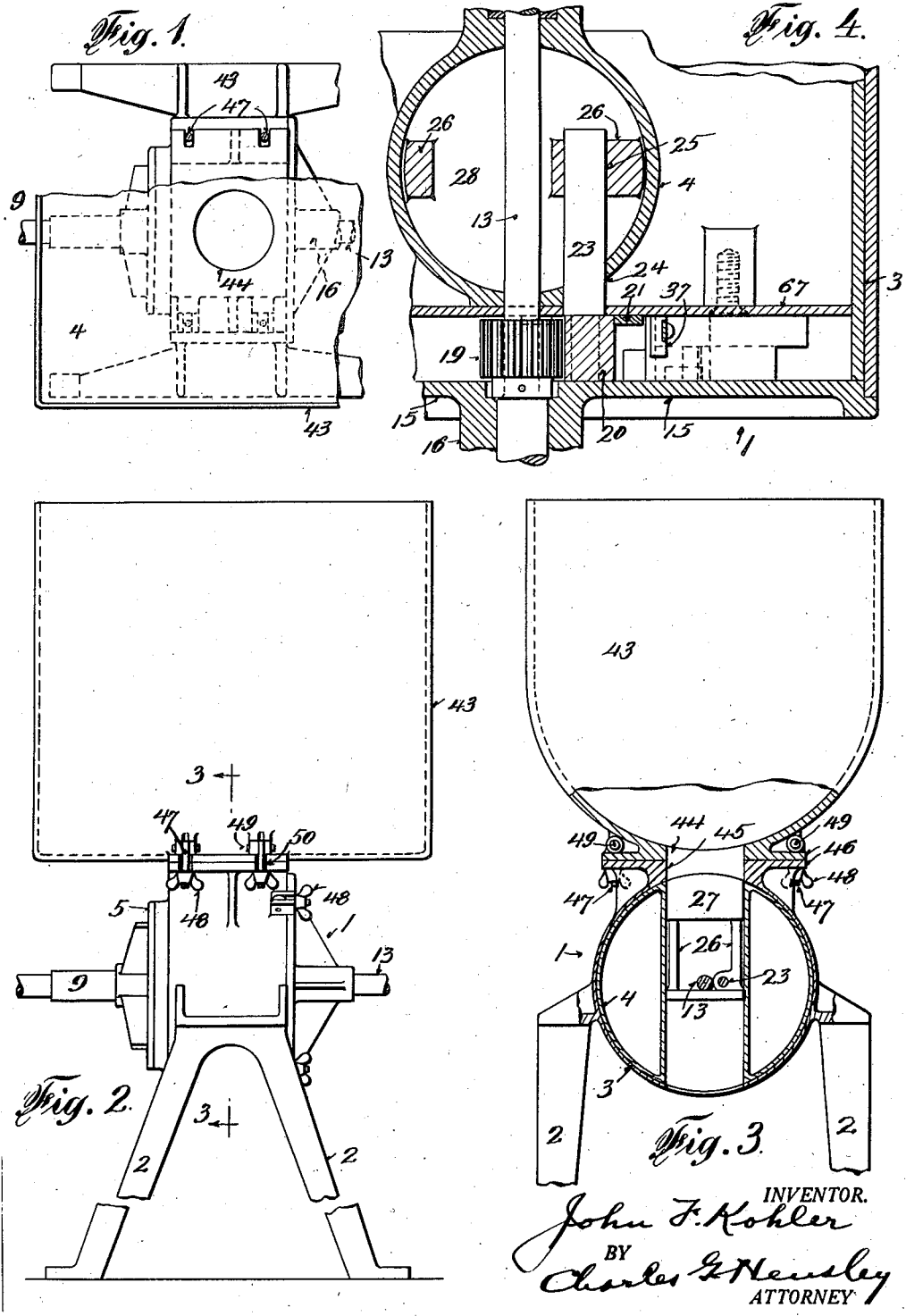

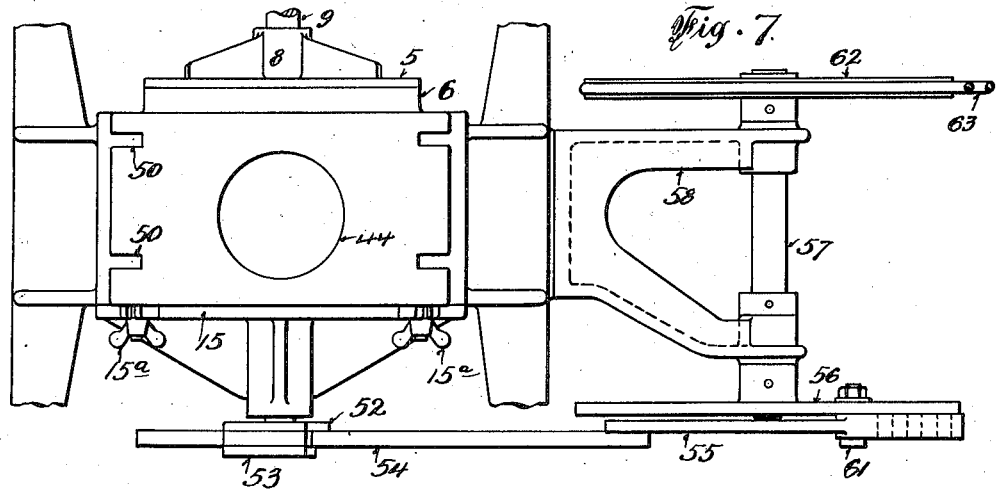
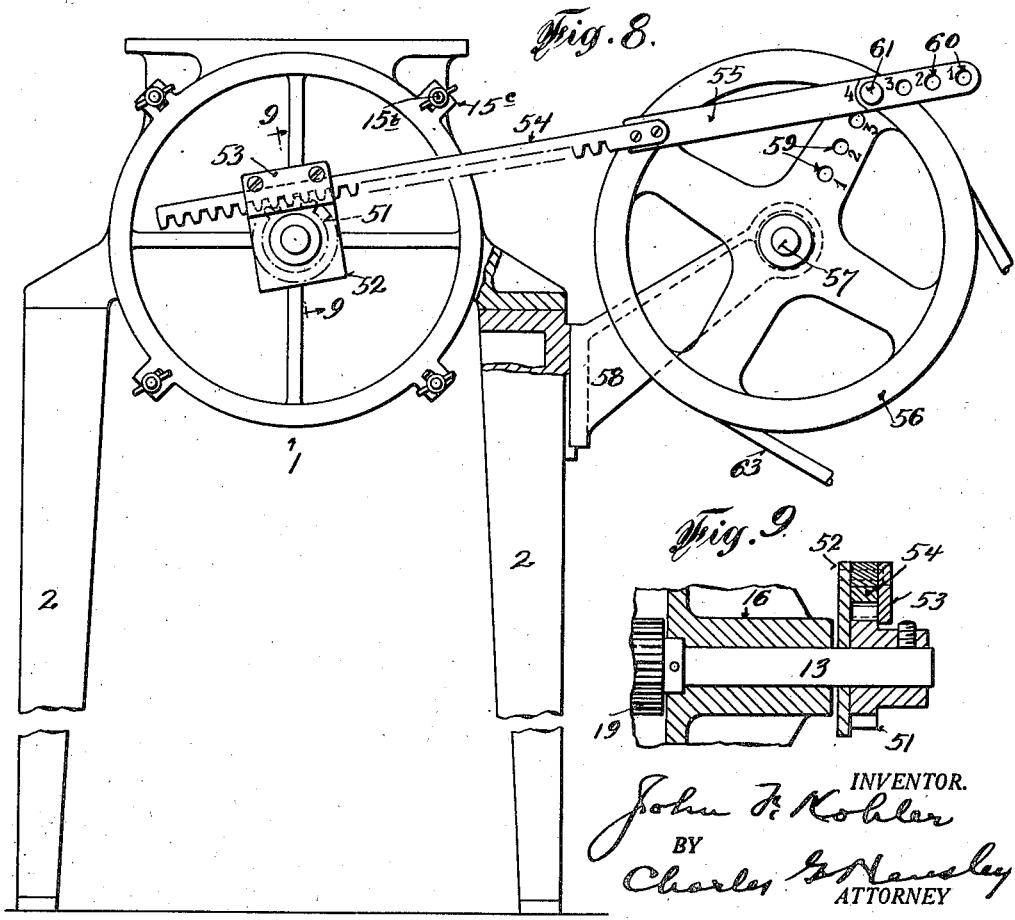

Patented Jan. 19, 1937

2,067,968

UNITED STATES PATENT OFFICE 2,067,968

DEPOSITING MACHINE

John F. Kohler, New York, N. Y.

Application September 9, 1935, Serial No. 39,799

14 Claims. (Cl. 221—103)

My invention relates to a machine for depositing measured quantities of material in a fluid or semi-fluid state, and while the invention may be adapted for different uses, I have applied it as a means for depositing fillers in pies and I will so describe the invention without intending to limit the scope of my protection to this particular use of the device.

The object of my invention is to provide a simple machine for depositing measured quantities of material; and it may be attached or applied to any pie making machine for the purpose of depositing the filler on the pie plate after the bottom crust dough has been laid upon the plate. The device may be used for filling open pies or for filling covered pies and in the latter case the dough for the top crust will be deposited upon the pie plate after the bottom crust dough and the filler have been applied. As my present machine works more or less independently of a pie making machine as a whole, except that its operations should be synchronized with the movements of the pie making machine, I have not attempted to show any part of the pie making machine itself other than the present invention, which relates to the depositing of the filler.

The present machine is adapted to handle various filling materials and as is well known in the art these filling materials are more or less glutinous or sticky and the present machine is designed to handle successfully materials of this kind for the reason that the entire single charge of material is completely driven out of the machine at each operation, whereas in most depositing machines heretofore made a valve or some similar element retains part of the charge after each operation, which retained portion of the charge was subsequently displaced by a successive charge.

In the handling of pie fillers it is necessary that no portion of the charge be retained in the machine after a given operation and the present machine is designed to accomplish the complete discharge at each operation. I employ an oscillating valve or cylindrical body having a cylinder in which a plunger reciprocates. When the valve body is in position for receiving a charge, the top of the plunger extends to the top of the cylinder or to the periphery of the valve body and the plunger makes the downward stroke under the action of a positive driving device so that a predetermined quantity of material is drawn into the cylinder above the piston; and the quantity of material thus taken into the cylinder can be regulated by adjusting the thrust of the piston.

After the piston has made a downward stroke to draw the material into the cylinder, the valve body, of which the cylinder is a part, is rotated on its own axis, preferably 180° to bring the open end of the cylinder into a downwardly directed position over the pie plate, or other receptacle in which the deposit is to be made, and then the piston makes a downward movement to eject the material previously drawn into the cylinder; and in this second movement of the piston its head moves to the end of the cylinder or to the periphery of the valve body so that all of the material previously drawn in will be completely ejected. After the piston has made its discharge movement the valve body is again oscillated 180° back to the position previously described, thus completing one cycle of operation.

The machine embodies a simple rack and gear device operated by a crank motion for both oscillating the valve and reciprocating the piston in opposite directions to accomplish the above purposes.

The machine also incorporates a simple device for locking the oscillating valve in its opposite positions so that while the charge is being drawn into the cylinder and also while it is being discharged therefrom, the valve body will be positively retained in locked position while these two operations are taking place. This locking action is also desirable because the same operating device which reciprocates the piston serves to oscillate the valve body.

The present machine is simple in construction and in operation; it is positive, and it is simple to make adjustments to regulate the amount of the material deposited. Other features and advantages will be set forth in the following detailed description of my invention.

In the drawings forming part of this application,

Figure 1 is an elevation of a machine embodying my invention,

Figure 2 is an end elevation of a machine embodying my invention,

Figure 3 is a vertical, sectional view taken on the line 3—3 of Figure 2,

Figure 4 is a horizontal sectional view of parts of the machine,

Figure 5 is a sectional view taken on the line 5—5 of Figure 6,

Figure 6 is a sectional view taken on the line 6—6 of Figure 5,

Figure 7 is a plan view of the machine,

Figure 8 is a front elevation of the machine with part of the frame broken away, and Figure 9 is a sectional view taken on the line 9—9 of Figure 8.

I have shown a housing 1 mounted upon legs 2 which latter are adapted to rest upon the floor to support the housing in an elevated position. This housing has a cylindrical longitudinal opening 3 therethrough and in this opening there is a valve body consisting of the cylindrical portion 4 which fits the interior surface of the opening 3 of the housing so that the valve body may revolve or oscillate within the housing. The valve fits rather closely to the interior of the housing around the perimeter in order to prevent material from leaking out between these members, although the fit is such as to permit the easy rotation of the valve within the housing.

At one side of the housing I have shown in Figure 5 a head or cap 5 which is seated by means of a break joint connection on the end of a boss 6 which is shown as formed integral with the housing and projecting laterally therefrom at one side. This head or cover is bolted to the housing by the bolts 7 so that it closes one side of the housing but is removable for the purpose of permitting the interior of the machine to be cleaned. This cover or head is provided at the central portion with a laterally extending boss 8 which forms a bearing for one end of the shaft 9 projecting through the boss.

The cylindrical valve body 4 is also formed at one side with a boss 10 which has a bore 11 registering with the bore of the boss 8 and the end of the shaft 9 also extends into the bore 11 of the boss 10. The valve body is also provided with a reduced bore 12 communicating with the bore 11 and the shaft 13 which is in alignment with the shaft 9 passes at one end through the smaller bore 12 and is seated in a bore 14 provided in the end of a shaft 9. The shaft 13 therefore has a bearing at one of its ends in one side wall of the valve body and the valve body is supported on one side on the end of the shaft 9 which latter has its bearing in the hub 8 of the housing.

The right hand wall 15 of the housing in Figure 5 is provided with the boss 16 which forms another bearing on the shaft 13 which extends therethrough. This wall of the housing is spaced from the right hand wall of the valve body, the parts being retained in this spaced relation by a lateral wall 17. The several parts form a chamber 18 within the housing to contain part of the operating mechanism as follows: On the shaft 13 there is fixed a pinion 19. At one side of this pinion there is mounted a sliding rack 20 which slides vertically between the guide rails 21 and it is held in place by a cover plate 22 so that the rack bar is maintained in constant mesh with the pinion 19.

This rack bar has projecting laterally from it a stud 23 which projects through an opening 24 in the valve body and this opening is elongated vertically to permit the stud to move a sufficient distance to reciprocate the piston the maximum thrust. This stud extends laterally into the valve body and it extends through an aperture 25 in one of the vertical posts 26 of the piston. The piston itself consists of a head 27 which fits closely within the bore of the cylinder 4. The piston also consists of the two vertical posts 26 and mounted on or integral with these posts the piston has a second head 28 spaced from the first head, and also fits closely to the bore of the cylinder and serves merely as a guide for the piston in conjunction with the head 27; that is to say, the second head merely guides the piston as a whole but it does not have any action on the material which is to be deposited.

The rack bar has bosses 29 extending at one side and through which there are threaded the screws 30, 31 which move with the bar and operate the locking devices. As shown in Figure 6 there is an angle lever 32 pivoted at 33 to one of the end plates of the valve body and the shorter arm of this lever reaches over into the path of one end of the screw 30.

The other arm of this lever extends downwardly in Figure 6 and engages in a recess 34 in a laterally reciprocating locking member 35 so that as the angle lever is rocked the locking member 35 is moved either to the right hand position in Figure 6 by the action of the flat spring 36 which is attached to a pin 37 at its middle portion with one end of the spring pressing the locking member 20 outwardly or toward the right; and when the angle lever is moved in the opposite direction by the engagement of the screw 31 therewith, the sliding locking member moves to the left to withdraw it from the path of certain stationary locking pins to be hereinafter described.

In the lower portion of Figure 6 there is shown a similar angle lever the smaller arm 38 of which reaches over into the path of the lower end of the screw 30. The longer arm 39 of the angle lever projects into a slot 40 in a second sliding locking member 41 which is slidably held to one head of the valve body by the guide 42. This locking member is also pressed to the right in Figure 6 by another arm of the spring 36. The locking member 41 also engages with certain stop pins as will be hereinafter set forth but it is disposed in an opposite position to the locking member 35 because it engages the opposite sides of the locking pis to that engaged by the locking member 35. The locking member 41 is in a different vertical plane than the member 35, or nearer the head 15.

It will be apparent that when the rack bar moves to its extreme upper position in Figure 6 the screw 31 will act on the lever 32 thus rocking this angle lever and drawing inwardly the locking member 35 against the opposition of the spring 36. Conversely, when the rack bar goes to its lowermost position the opposite end of the screw 30 engages the arm 38 of the lower angle lever and the arm 39 moves the sliding locking member 41 against the opposition of the spring 36 to withdraw the locking member from the path of a stationary locking pin.

I have shown a hopper 43 to receive and hold the supply of material to be deposited, and this hopper is shown as provided at its lower end with an opening 44 registering with a similar opening 45 in the housing of the valve, the valve body and the hopper having lateral flanges 46 resting upon each other and clamped together by bolts 47 provided with wing nuts 48 which swing on the pins 49 with the bolts moving laterally into the slots 50 in the flanges 46. By loosening these swing nuts and swinging the bolts out of the slots 50 the hopper may be quickly disengaged from the valve body. This may be done whenever the machine is to be cleaned or when the hopper which has been supplying one type of filler is to be displaced by another holding a different type of material.

The shaft 13 which carries the pinion 19 projects through the boss 16 to the exterior of the machine where it is provided with a pinion 51 fixed to the shaft. There is a housing 52 pivotally mounted on this shaft 13 and between the wall of the housing and the face plate 53 secured thereto there is slidably mounted a rack bar 54 the teeth of which mesh with the teeth of the pinion 51. The rack bar is attached rigidly to the bar 55 which extends to the right in Figure 8 and is pivotally connected with the crank disc 56 which is mounted on a shaft 57 the latter being supported in hubs on the end of a fork shaped bracket 58 attached to the frame of the machine.

The crank disc 56 is shown as provided with several holes 59 there being four in the illustrated construction; and the bar 55 is also provided with a corresponding number of apertures 60 the same distance apart as the holes 59 on the crank disc. For convenience I have numbered the sets of holes 1, 2, 3 and 4 to represent different thrusts of the piston for depositing different quantities of material, for instance, 1, 2, 3 or 4 ounces.

A bolt 61 passes through one of the apertures 60 of the bar 55 and through a corresponding aperture 59 on the crank disc, thereby forming a pivotal connection between the crank disc and the bar. On the opposite end of the shaft 57 to that on which the crank disc is mounted I have shown a pulley 62 which is operated by a belt 63 from any source of power.

Assuming the hopper is supplied with a quantity of material to be deposited, and assuming that the valve body is in the position indicated in Figure 3, the piston head will be in its upper position so that the curved top of the piston head coincides with the curvature of the valve body. In Figure 6 the parts are shown in the position just before the piston reaches its extreme upper position and just as the screw 31 is about to act on the lever 32. By the time the piston, and likewise the rack bar, are in their extreme upper positions the lever 32 will have been acted upon by the screw 31 to rock this angle lever and withdraw the sliding locking member 35 from the path of the locking pins.

I have shown three pins 64, 65, 66 attached to the stationary head 15 of the machine and projecting toward the plate 67 which is attached to the valve body. I have shown three such pins disposed 120° apart in Figure 6.

If it is desired to deposit, say, four ounces of material at each operation of the machine, the bolt 61 will be placed through the apertures marked 4 on both the crank disc and the bar 55. As this connection is farthest from the axis of the shaft 57 this will be the maximum thrust of the crank motion and it will cause the maximum thrust of the piston. If it is desired to deposit three ounces at each operation of the machine, then the bolt 61 will be passed through apertures 3 in the bar 55 and in the crank disc 56. Likewise the bolt 61 may be adjusted to the No. 2 holes or the No. 1 holes for depositing two ounces or one ounce, respectively, at each operation.

While I have designated figures representing ounces, it is obvious that any other size deposits may be made by designing the holes accordingly.

The arrangement of the holes in the bar 55 and in the crank disc are such that the upper thrust of the piston terminates at the same point, that is, with the top of the piston coinciding with the periphery of the valve body; but the downward thrust corresponds with the quantity of material to be drawn in by the piston and to be discharged at each operation.

As the bars 54, 55 are moved back and forth by the crank disc the action on the pinion 51 will cause the shaft 13 to be oscillated about 180°. Assuming that the piston is in its extreme upward position the oscillating motion imparted to the shaft 13 will cause the pinion 19 to act on the rack bar 20 and to move it downwardly in Figures 5 and 6. The extent of this downward movement will depend upon what holes the bolt 61 extend through in the rod 55 and the crank disc 56. Let us say that the bolt is adjusted in holes marked 4, the downward movement of the rack bar 20 caused by the pinion 19 will act through its pin 23 upon the piston and move the same downwardly while the valve body is held from rotation by the engagement of the locking members.

As the piston thus moves downwardly it will suck into the cylinder a quantity of the material which feeds by gravity from the hopper to the bottom hole 44 of the latter and the upper hole 45 of the valve housing. In the instance cited, the piston will draw four ounces of material into the cylinder. When the downward motion of the piston has been completed, the screw 30 will act on the lever arm 38, thus actuating the angle lever 39 and withdrawing the locking member 41 from the path of the locking pin 64. During this downward movement of the rack bar the screw 31 will disengage from the lever 32 and the spring 36 pressing on the locking member 35 will move the same to the right or into the position shown in Figure 6 where the locking member will be in the path of the locking pin 65.

The pin 64 projects inwardly from the head 15 sufficiently to engage the locking member 41 but not far enough to engage the locking member 35 which, as has been pointed out, is in a different vertical plane to the locking member 41. The pin 65 is farther from the axis of the shaft 13 than the pin 64 and it is sufficiently long to be engaged by the locking member 35, but it is too far from the axis of the shaft to be engaged by the locking member 41. In other words, the locking member 41, during its travel with the valve body, does not come in contact with the pin 65.

There are two pins 68, 69 projecting from the face of the plate 67 which is a part of the valve body, and these pins arranged 180° apart are adapted to stop against the stationary pin 66 to limit the revolution of the valve body to an arc of about 180°.

In the condition of the parts shown in Figure 6, the valve body is locked against rotation in either direction; first, because the pin 68 carried by the valve body is resting against the stop pin 66 to prevent the valve body moving counterclockwise in Figure 6. Second, because the locking member 41 is engaged with the stop pin 64, preventing the valve body turning clockwise. As described above, reciprocation of the rack bar first causes the piston to be reciprocated to draw the charge of material into the piston and then the screw 30 acts on the lever arm 38 to withdraw the locking member 41 from the stop pin 64, and this action unlocks the valve body so that the continuation of the movement of the pinion 19 causes the valve body to turn clockwise in Figure 6 until the cylinder is in a vertical position with the piston end of the cylinder registering with the discharge opening 70 in the plate 17.

As this point is reached, the locking member 35 will have been brought around until the stop pin 65 acts on the slanting surface 71 of the locking member 35 temporarily moving the latter inwardly until the end of the locking member escapes past the pin 65, whereupon the locking member is sprung outwardly under the action of the spring 36. When this occurs, the locking member 35 resting against the pin 65 will lock the valve body against revolution in a counterclockwise direction. By this time the pin 69 will have come to rest against the left side of the stop pin 66 in Figure 6, thus locking the valve body against revolution in a clockwise direction. When the valve body is thus locked the rack bar will begin to reciprocate in a direction opposite to that previously described and this will cause the pin 23 to move the piston downwardly until its face comes flush with the bottom opening of the cylinder, and this will eject from the cylinder the material which was previously drawn into it while the valve body was in the inverted position.

After the piston has been moved to the end of the cylinder, the pinion 19 moves further and the first action is to cause the screw 31 to rock the lever 32 and withdraw the locking member 35 from engagement with the stop pin 65 whereupon further movement of the pinion 19 causes the valve body to turn counterclockwise in Figure 6 until it revolves 180° back to the position shown in Figure 6. Just before the valve body reaches the position shown in Figure 6, the slanting edge 72 of the locking member 41 strikes the stop pin 64, forcing the locking member back so that it escapes past the pin 64 and is then projected outwardly by the spring 36 so that the locking member then engages the pin 64 in the relation shown in Figure 6.

From the above it will be apparent that the reciprocating rack bar performs the double function of moving the piston within the cylinder, first to draw in a charge of the material into the cylinder, then on the same stroke to revolve the cylinder 180° to bring the cylinder into an inverted position; then on the return movement of the rack bar the piston is moved downwardly to discharge the charge from the cylinder, and then during the same stroke of the rack bar the valve body is moved back counterclockwise into the original position, ready for the piston to draw in another charge. This cycle of operations is repeated continually as long as the machine is in operation. The valve body is locked in both the intake and discharge positions.

It will be apparent that by means of a reciprocating rack bar I am enabled by simple mechanism to reciprocate the piston within the cylinder to draw in and exude the charge of material and also to oscillate the valve body, all in synchronism; and also the locking devices are automatically effective for locking the valve body during the movements of the piston.

Having described my invention, what I claim is:

1. An extruding machine including a shaft, an oscillating valve body revolving around said shaft and having a cylinder therein, means for holding a source of supply of material to be drawn into the cylinder while the cylinder has its open end directed upwardly toward said source of supply, a piston reciprocable in said cylinder for the purpose of drawing a charge into said cylinder and extruding the same therefrom, and means for operating said piston and valve body including a reciprocating rack, a pinion on said shaft for operating said rack, means associated with said rack for reciprocating said piston downwardly while the open end of the cylinder is in communication with the source of supply, and to extrude the charge from the cylinder by a downward movement after inversion of the valve body, said pinion also serving to oscillate said valve body to place said cylinder alternately into charge receiving and charge extruding positions.

2. An extruding machine including a shaft, an oscillating valve body revolving around said shaft and having a cylinder therein, means for holding a source of supply of material to be drawn into the cylinder while the cylinder has its open end directed upwardly, a piston reciprocable in said cylinder for the purpose of drawing a charge of material therein and extruding the same therefrom, means for operating said piston and valve body, including a reciprocating rack, a pinion on said shaft for operating said rack, means associated with said rack for reciprocating said piston downwardly while the open end of the cylinder is in communication with the source of supply and to extrude the charge from the cylinder by a downward movement after inversion of the valve body, said pinion also serving to oscillate said valve body to place said cylinder alternately into charge receiving and charge extruding positions, and means including a crank movement for oscillating said shaft.

3. An extruding machine including a shaft, an oscillating valve body revolving around said shaft and having a cylinder therein, means for holding a source of supply of material to feed to the cylinder, a piston reciprocable in said cylinder for the purpose of drawing a charge of material therein and extruding the same therefrom, means for operating said piston and valve body including a reciprocating rack, a pinion on said shaft for operating said rack, means associated with said rack for reciprocating said piston, said pinion also serving to oscillate said valve body to place said cylinder alternately into charge receiving and charge extruding positions, and means for oscillating said shaft including a second pinion on said shaft, a rack for operating said last mentioned pinion, and a crank device for operating said second mentioned rack.

4. An extruding machine including a shaft, an oscillating valve body revolving around said shaft and having a cylinder therein, means for holding a source of supply of material to feed to the cylinder, a piston reciprocable in said cylinder for the purpose of drawing a charge of material therein and extruding the same therefrom, means for operating said piston and valve body including a reciprocating rack, a pinion on said shaft for operating said rack, means associated with said rack for reciprocating said piston, said pinion also serving to oscillate said valve body to place said cylinder alternately into charge receiving and charge extruding positions, and means for oscillating said shaft including a second pinion on said shaft, a rack for operating said last mentioned pinion, and a crank device for operating said second mentioned rack including means for adjusting the connections of the crank device, thereby regulating the thrust of said piston.

5. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, a second pinion on said shaft, a housing pivoted on said shaft, a rack guided in said housing and meshing with said second mentioned pinion, and a crank device for operating said second mentioned rack to oscillate said shaft.

6. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a rack slidably mounted upon and movable with said valve body, a pinion on said shaft for reciprocating said rack, means associated with said rack for reciprocating said piston, said pinion also serving to oscillate said valve body to place said cylinder alternately into charge receiving and charge extruding positions, and means for oscillating said shaft.

7. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding position, and means for automatically locking said valve body in charge receiving position until said piston has made its charge intake motion.

8. An extruding machine including a shaft, an oscillating valve body revolving around said shaft and having a cylinder therein, means for holding a source of supply of material for delivery to said cylinder, a piston reciprocable in said cylinder, to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, means for locking said cylinder in charge receiving position while the piston is making its intake stroke, and means associated with said rack for releasing said locking means after the intake stroke of the piston to permit said valve body to be oscillated into charge extruding position.

9. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, and means for locking said valve body in extruding position while said piston is making its extruding stroke.

10. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, means for locking said valve body in extruding position while said piston is making its extruding stroke, and means associated with said rack for releasing said locking means to permit said valve body to be oscillated after the piston has made its extruding stroke.

11. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, means for locking said valve body in charge receiving position while the piston is making its intake stroke, means for locking said valve body in extruding position while the piston is making its extruding stroke, and means associated with said rack for alternately releasing said locking devices.

12. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, stop means for limiting the oscillations of said valve body to approximately 180°, locking means operating in conjunction with said stop means to lock the valve body in charge receiving and charge extruding positions while the piston is making its intake and extruding strokes respectively, and means associated with said rack for automatically releasing said locking means alternately.

13. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, a stationary abutment member, a locking member carried by said valve body, spring pressed in one direction, said locking member adapted to escape past said abutment member in one direction and to lock against the same in an opposite direction, and means operating automatically about the time said rack completes its reciprocation for automatically retracting said locking member to permit the valve body to be oscillated.

14. An extruding machine including a shaft, an oscillating valve body revolving around said shaft and having a cylinder therein, means for holding a source of supply of material for delivery to said cylinder, a piston reciprocable in said cylinder to draw a charge of material into and extrude the same therefrom, means for operating said piston and said valve body, including a reciprocating rack, a pinion on said shaft for operating said rack, means associated with said rack for reciprocating said piston, said pinion also serving to oscillate said valve body to place said cylinder alternately into charge receiving and charge extruding positions, a plurality of abutment members disposed at relatively different distances from the axis of said valve body, a plurality of locking members carried by said valve body and so disposed as to separately co-operate with said abutment members, said locking members being spring pressed in one direction and constructed to escape past the respective abutment members, each in one direction, and to lockingly engage said abutment members in opposite directions and means for automatically releasing said locking members alternately at about the time said rack completes its movement in opposite directions.

JOHN F. KOHLER.